(12) United States Patent
Graf (10) Patent No.: US 10,481,271 B2
(45) Date of Patent: *Nov. 19, 2019

(54) AUTOMOTIVE LIGHTING SYSTEM FOR A VEHICLE

(71) Applicant: MAGNA ELECTRONICS SOLUTIONS GMBH, Wetzlar (DE)

(72) Inventor: Stefan Graf, Taipei (TW)

(73) Assignee: MAGNA ELECTRONICS SOLUTIONS GMBH, Wetzlar (DE)

( * ) Notice: Subject to any disclaimer, the term of this patent is extended or adjusted under 35 U.S.C. 154(b) by 22 days.

This patent is subject to a terminal disclaimer.

(21) Appl. No.: 15/727,806

(22) Filed: Oct. 9, 2017

(65) Prior Publication Data

US 2018/0031707 A1 Feb. 1, 2018

Related U.S. Application Data

(63) Continuation of application No. 14/554,808, filed on Nov. 26, 2014, now Pat. No. 9,784,839.

(51) Int. Cl.
*G01S 17/93* (2006.01)
*B60Q 1/00* (2006.01)
*G01S 17/87* (2006.01)
*G01S 13/93* (2006.01)

(52) U.S. Cl.
CPC .......... *G01S 17/936* (2013.01); *B60Q 1/0023* (2013.01); *G01S 17/87* (2013.01); *G01S 2013/9396* (2013.01)

(58) Field of Classification Search
CPC .... G01S 7/4813; G01S 7/4972; G01S 17/936; G01S 2007/4977; G05D 1/024; G05D 1/0214
See application file for complete search history.

(56) References Cited

U.S. PATENT DOCUMENTS

| 5,313,072 A | 5/1994 | Vachss |
| 5,426,294 A | 6/1995 | Kobayashi et al. |
| 5,670,935 A | 9/1997 | Schofield et al. |

(Continued)

FOREIGN PATENT DOCUMENTS

| CN | 105093210 A | 11/2015 |
| CN | 105093228 A | 11/2015 |

(Continued)

*Primary Examiner* — Luke D Ratcliffe
(74) *Attorney, Agent, or Firm* — Honigman LLP (57) ABSTRACT

An automotive lighting system for a vehicle includes a taillight disposed at a vehicle equipped with an external object detection system. The taillight includes a housing that contains a light source that is operable to illuminate at least rearward of the equipped vehicle. The external object detection system includes a LIDAR sensor that is disposed in the housing of the taillight. The LIDAR sensor is operable to emit optical signals at least rearward of the equipped vehicle, where optical signals reflected back to the LIDAR sensor are processed by an electronic control unit of the external object detection system. Processing of reflected optical signals by the electronic control unit detects an object present exterior of the equipped vehicle. Also, processing by the electronic control unit may include use of 3D imaging techniques to generate a 3D image of the object present exterior of the equipped vehicle.

19 Claims, 8 Drawing Sheets

(56) References Cited

U.S. PATENT DOCUMENTS

| | | |
|---|---|---|
| 5,796,094 A | 8/1998 | Schofield et al. |
| 5,877,897 A | 3/1999 | Schofield et al. |
| 6,313,454 B1 | 11/2001 | Bos et al. |
| 6,396,397 B1 | 5/2002 | Bos et al. |
| 6,824,281 B2 | 11/2004 | Schofield et al. |
| 7,038,577 B2 | 5/2006 | Pawlicki et al. |
| 7,972,045 B2 | 7/2011 | Schofield |
| 8,013,780 B2 | 9/2011 | Lynam |
| 9,036,026 B2 | 5/2015 | Dellantoni et al. |
| 9,126,525 B2 | 9/2015 | Lynam et al. |
| 9,264,673 B2 | 2/2016 | Chundrlik, Jr. et al. |
| 9,784,839 B2 | 10/2017 | Graf |
| 2005/0278098 A1 | 12/2005 | Breed |
| 2012/0154785 A1* | 6/2012 | Gilliland ............... G01S 7/4813 356/5.01 |
| 2013/0049588 A1* | 2/2013 | Foltin .................... B60Q 1/115 315/82 |
| 2013/0314503 A1 | 11/2013 | Nix et al. |
| 2014/0049646 A1 | 2/2014 | Nix |
| 2015/0323504 A1 | 11/2015 | Wei et al. |
| 2015/0331100 A1 | 11/2015 | Hsu et al. |

FOREIGN PATENT DOCUMENTS

| | | |
|---|---|---|
| DE | 102015006032 A1 | 11/2015 |
| DE | 102015208561 A1 | 11/2015 |

\* cited by examiner

AUTOMOTIVE LIGHTING SYSTEM FOR A VEHICLE

CROSS REFERENCE TO RELATED APPLICATION

The present application is a continuation of U.S. patent application Ser. No. 14/554,808, filed Nov. 26, 2014, now U.S. Pat. No. 9,784,839, which is hereby incorporated herein by reference in its entirety.

TECHNICAL FIELD

The present invention is related to an automotive lighting device and a vehicle having the same, and in particular, to an automotive lighting device including at least one optical sensor and a vehicle having the same.

BACKGROUND

Recently, vehicle technology has undergone significant changes in automotive electronics. Many assistant systems, for example, Lane-Departure-Warning, Collision-Avoidance-System, Brake-Assistants, and Traffic-Sign-Recognition, are provided to assist the driver to recognize potential hazards while driving or maneuvering a vehicle. In general, an assistant system of a vehicle requires sensors to provide the external surrounding information of the vehicle.

SUMMARY

The invention is directed to an automotive lighting device of a vehicle which integrates at least one sensor inside for detecting the surrounding of the vehicle. The invention is further directed to a vehicle using such an automotive lighting device.

According to one embodiment of the present invention, an automotive lighting device with external obstacle detection includes a housing and at least one optical sensor disposed in the housing. The at least one optical sensor is configured to emit an optical signal and generating a data signal in response to a received reflected optical signal.

According to one embodiment of the present invention, a vehicle with external obstacle detection includes a plurality of automotive lighting devices installed surrounding on a body of the vehicle. Each of the automotive lighting devices comprises a housing and at least one optical sensor disposed in the housing. The at least one optical sensor is configured to emit an optical signal and generating a data signal in response to a received reflected optical signal. The data signal includes information of an area external to the vehicle.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Figure 1:
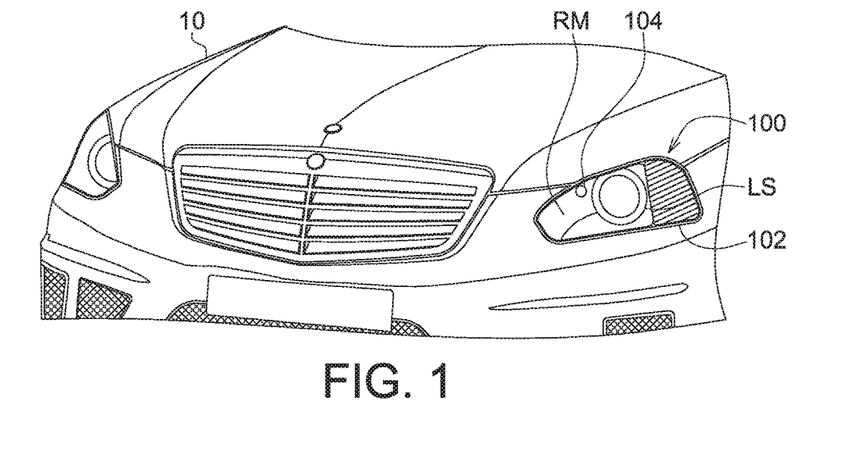
FIG. 1 shows an automotive lighting device installed on a vehicle according to one embodiment of the present invention.

FIG. 1 shows an automotive lighting device 100 installed on a vehicle 10 according to one embodiment of the present invention. As shown in FIG. 1, the automotive lighting device 100 includes a headlight of the vehicle 10, but the present invention is not limited thereto. In some embodiments, the automotive lighting device 100 includes a tail light. In some embodiments, the automotive lighting device 100 includes a fog light. In other embodiments, the automotive lighting device 100 includes a daytime running light. In other embodiments, the automotive lighting device 100 includes an indicator. In still other embodiments, the automotive lighting device 100 includes a mirror mounted indicator.

The automotive lighting device 100 comprises a housing 102 and at least one optical sensor 104 disposed in the housing 102. The housing 102 has a transparent surface that allows light to pass through. The at least one optical sensor 104 is configured to emit an optical signal and generating a data signal in response to a received reflected optical signal. In some embodiments, the at least one optical sensor 104 includes a light detection and ranging sensor, for example a LIDAR. The at least one optical sensor 104 can be disposed on a reflecting mirror RM of the automotive lighting device 100, wherein the reflecting mirror RM is configured to reflect the light emitted from the light source LS of the automotive lighting device 100.

Moreover, in some embodiments, a detection angle of the at least one optical sensor 104 includes below approximately 120° horizontally and vertically. In other embodiments, a detection angle of the at least one optical sensor 104 includes above approximately 120° horizontally and vertically. In still other embodiments, a detection angle of the at least one optical sensor 104" includes approximately from 0° to 180° horizontally and vertically.

It is understood that the location/number of the optical sensor 104 shown in FIG. 1 is for illustrating purposes, not for restriction purposes, since the present invention may be implemented in many different ways in accordance with practical needs as long as the optical path of the optical signal emitted from the optical sensor remains unobstructed.

Figure 2:
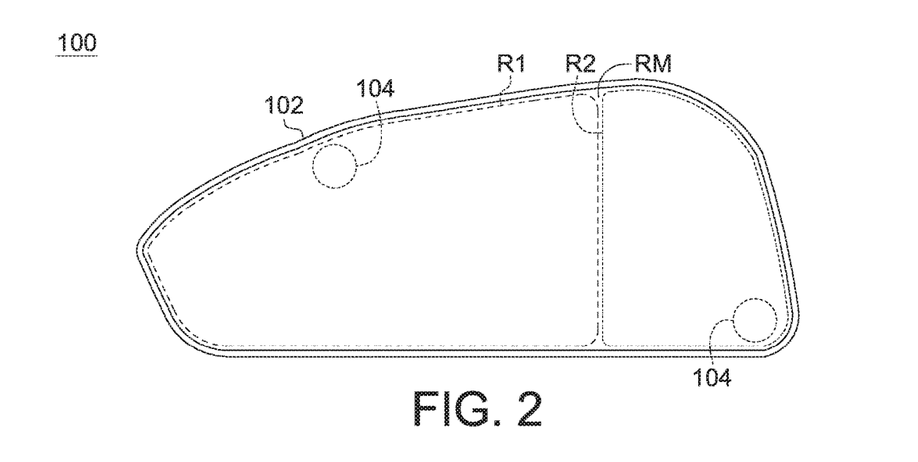
FIG. 2 shows the potential locations for disposing the optical sensor in the automotive lighting device according to one embodiment of the present invention.

FIG. 2 shows a location for disposing the optical sensor 104 in the automotive lighting device 100 according to one embodiment of the present invention. In this embodiment, the automotive lighting device 100 comprises a first part R1 for headlight illumination and a second part R2 for indicator illumination. The location of the optical sensor 104 is possible everywhere as long as the optical path of the optical signal (e.g. laser beam) remains unobstructed. As shown in FIG. 2, for example, there are two locations for disposing the optical sensor 104. In this embodiment, one location is at the upper side of the reflecting mirror (RM) of the first part R1 and the other one is at the lower right side of RM of the second part R2. However, the present invention is not limited thereto. In some embodiments, the at least one optical sensor 104 can be disposed in other locations of the automotive lighting device 100 as long as the optical path of the optical signal emitted from the optical sensor 104 remains unobstructed.

Figure 3A:
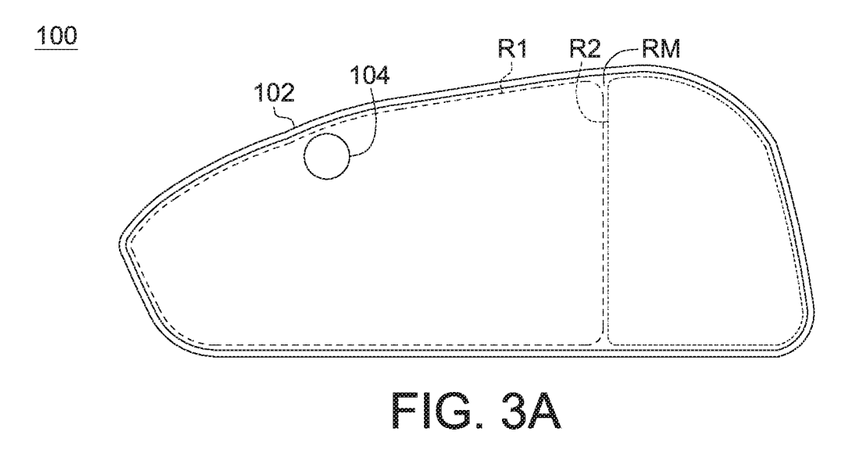
FIG. 3A shows a schematic diagram of the automotive lighting device including an optical sensor according to one embodiment of the present invention.

FIG. 3A shows a schematic diagram of the automotive lighting device including an optical sensor according to one embodiment of the present invention. As shown in FIG. 3A, in some embodiments, there is only one optical sensor 104 disposed in the housing 102 of the automotive lighting device 100.

Figure 3B:
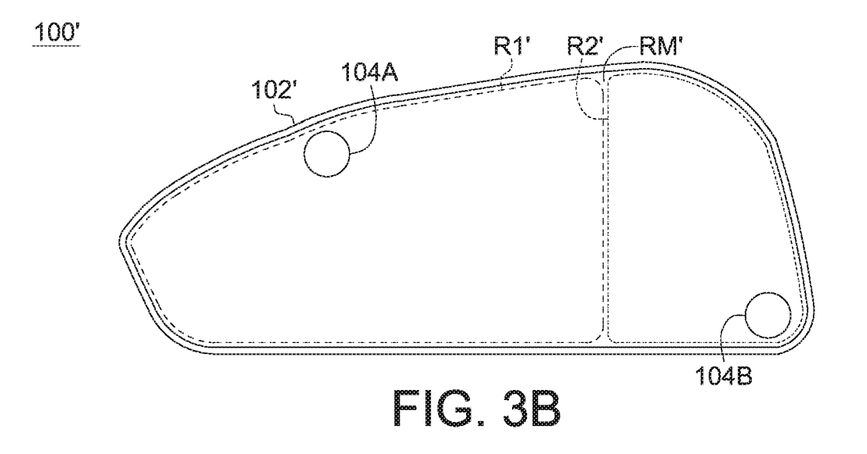
FIG. 3B shows a schematic diagram of the automotive lighting device including a plurality of optical sensors according to one embodiment of the present invention.

FIG. 3B shows a schematic diagram of the automotive lighting device including a plurality of optical sensors according to one embodiment of the present invention. In another one embodiment, as shown in FIG. 3B, two optical sensors 104A and 104B are installed in the housing 102' of an automotive lighting device 100'. In this embodiment, the automotive lighting device 100' comprises a first part R1' for headlight illumination and a second part R2' for indicator illumination, but the present invention is not limited thereto. The optical sensor 104A is disposed at the upper side of the reflecting mirror RM' of the first part R1' whereas the optical sensor 104B is disposed at the lower right side of the reflecting mirror RM' of the second part R2'. The optical sensors 104A and 104B emit optical signals and generating data signals in response to received reflected optical signals.

Figure 4A:
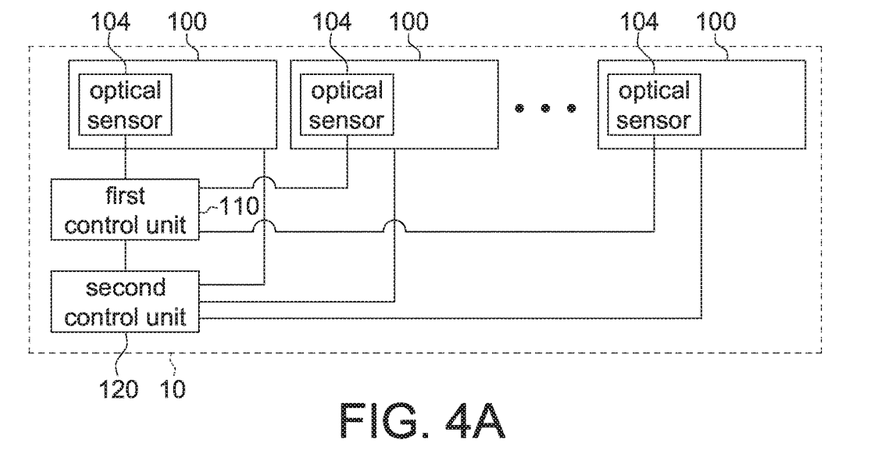
FIG. 4A shows a block diagram of the vehicle according to one embodiment of the present invention.

FIG. 4A shows a block diagram of the vehicle 10 according to one embodiment of the present invention. The vehicle 10 includes a plurality of automotive lighting devices 100, a first control unit 110 and a second control unit 120. As shown in FIG. 4A, the plurality of automotive lighting devices 100 respectively includes at least one optical sensor 104.

The at least one optical sensor 104 such as a LIDAR is configured to emit optical signals and generate data signals in response to received reflected optical signals.

The first control unit 110 coupled to the plurality of automotive lighting devices 100 is configured to control the at least one optical sensor 104 in response to the data signal coming from the at least one optical sensor 104. In some embodiments, the first control unit 110 includes a control circuit of a mirror sensor. In some embodiments, the first control unit 110 includes a control circuit of a laser sensor.

The second control unit 120 is respectively coupled to the first control unit 110 and the automotive lighting device 100. The second control unit 120, in some embodiments, includes, for example, a body control unit (BCU) of the vehicle 10. In some embodiments, the first control unit 110 communicates with the second control unit 120 via an interface. Moreover, the interface includes, for example, Internet Information Services (IIS), Sony/Philips Digital Interface Format (SPDIF), common controller area network (CAN), local interconnect network (LIN) and all kinds of suitable communication interface.

The second control unit 120 is configured to determine whether an obstacle exists by analyzing the data signal coming from the at least one optical sensor 104. Moreover, the second control unit 120 adjusts brightness, light beam directions and focus of the automotive lighting device 100 in response to the data signal. In some embodiments, the second control unit 120 delivers an alert message when a distance between the vehicle and a detected obstacle is shorter than a threshold value. The threshold value includes approximately, for example, 50 meters.

Furthermore, in some embodiments, as shown in FIG. 4A, the second control unit 120 may provide the 2D/3D information, for example, position, size and distance, of the detected obstacle in response to the data signal to the driver. In some embodiments, the second control unit 120 may use 3D imaging technique to generate a 3D image of the detected obstacle to the driver.

In some embodiments, the at least one optical sensor 104 communicates with other components (e.g., the light source LS shown in FIG. 1) of the automotive lighting device 100 via a common controller area network (CAN) bus. In other embodiments, the at least one optical sensor 104 communicates with other components of the automotive lighting device 100 via a local interconnect network (LIN) bus.

Figure 4B:
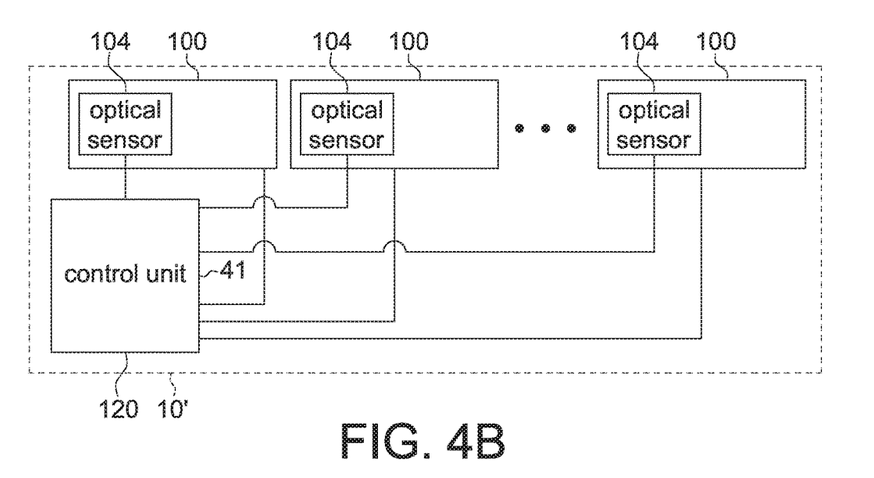
FIG. 4B shows a block diagram of the vehicle according to one embodiment of the present invention.

FIG. 4B shows a block diagram of the vehicle 10' according to one embodiment of the present invention. As shown in FIG. 4B, the vehicle 10' is similar to the vehicle 10 of FIG. 4A but includes a control unit 41. In this embodiment, the control unit 41 is coupled to the plurality of automotive lighting devices 100. The control unit 41 is configured to control the at least one optical sensor 104 in response to the data signal coming from the at least one optical sensor 104, and determine whether an obstacle exists by analyzing the data signal coming from the at least one optical sensor 104.

Moreover, brightness, light beam directions and focus of the automotive lighting device 100 are adjusted, in response to the data signal, by the control unit 41. Furthermore, the control unit 41 delivers an alert message when a distance between the vehicle and a detected obstacle is shorter than a threshold value. The threshold value includes approximately, for example, 50 meters.

In this embodiment, since the lighting device 100 and the at least optical sensor 104 are coupled to the control unit 41, there is one node needed in communicating with other components via a network of the vehicle 10'.

Furthermore, in some embodiments, as shown in FIG. 4B, the control unit 41 may provide the 2D/3D information, for example, position, size and distance, of the detected obstacle in response to the data signal to the driver. For example, the control unit 41 may use 3D imaging technique to generate a 3D image of the detected obstacle to the driver.

Figure 5A:
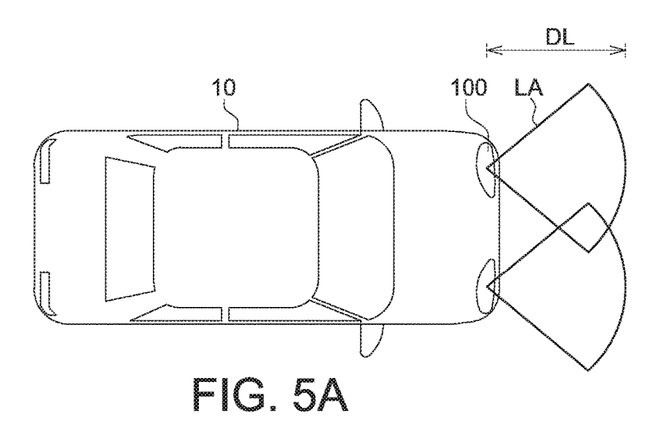
FIG. 5A shows a schematic view of lightening areas of the automotive lighting devices, when the optical sensors of the automotive lighting devices do not detect an obstacle according to one embodiment of the present invention.

FIG. 5A shows a schematic view of lightening areas LA of the automotive lighting devices 100, when the optical sensors 104 of the automotive lighting devices 100 do not detect an obstacle according to one embodiment of the present invention. As shown in FIG. 5A, when the optical sensors 104 do not detect an obstacle, the brightness of the automotive lighting devices 100 will be maintained at a first value and a coverage distance of the lightening areas LA is a distance DL.

Figure 5B:
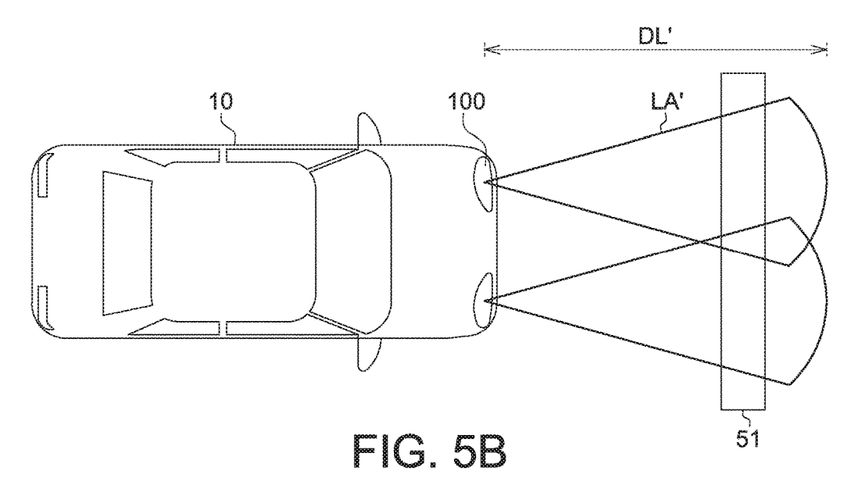
FIG. 5B shows a schematic view of lightening areas of the automotive lighting devices, when the optical sensors of the automotive lighting devices detect an obstacle according to one embodiment of the present invention.

FIG. 5B shows a schematic view of lightening areas LA' of the automotive lighting devices, when the optical sensors of the automotive lighting devices detect an obstacle according to one embodiment of the present invention. As shown in FIG. 5B, when the optical sensors 104 of the automotive lighting devices 100 detect an obstacle 51 in front of the vehicle 10, the second control unit 120 of the vehicle 10 may raise up the brightness of the automotive lighting devices 100 to enhance the illumination towards the detected obstacle 51. Therefore, the brightness of the automotive lighting devices 100 may be raised up to a second value and a distance of the lightening areas LA' may extend to a distance DL'. In this embodiment, the distance DL' is longer than the distance DL.

Figure 6:
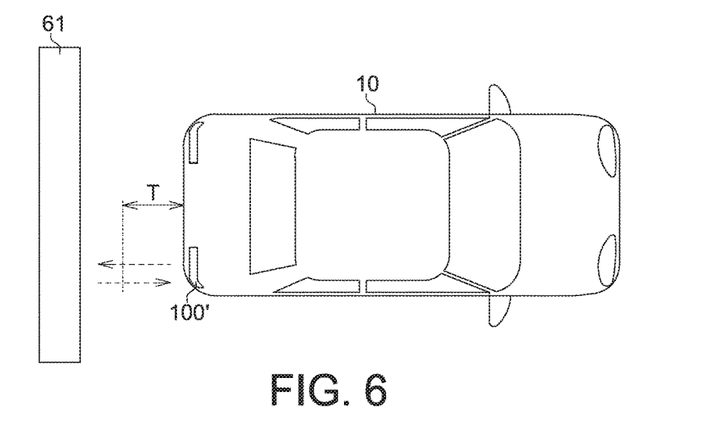
FIG. 6 shows a schematic diagram illustrating the vehicle moving in reverse according to one embodiment of the present invention.

FIG. 6 shows a schematic diagram illustrating the vehicle 10 moving in reverse. As shown in FIG. 6, an obstacle 61 is on a moving path of the vehicle 10. In this embodiment, the automotive lighting device 100' includes a tail light of the vehicle 10. As shown in FIG. 6, when the vehicle 10 moving in reverse towards the obstacle 61, a distance between the automotive lighting device 100' and the obstacle 61 is gradually shorted. Therefore, in order to detect the distance, at least one optical sensor is disposed in the automotive lighting device 100'. The at least one optical sensor emits an optical signal towards the obstacle 61 and generate a data signal in response to a received reflected optical signal. The received reflected optical signal is generated in response the optical signal.

Moreover, the data signal includes information of the distance between the automotive lighting device 100' and the obstacle 61. When the distance is shorter than a threshold value T, determined by the second control unit 120 of the vehicle 10, the second control unit 120 may deliver an alert message to remind the driver to stop the vehicle 10.

Figure 7A:
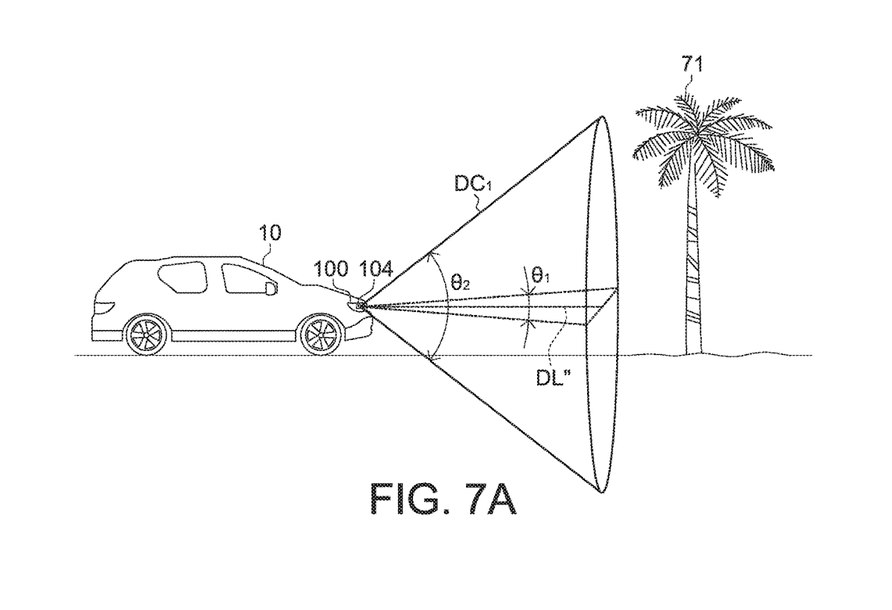
FIG. 7A shows a detection coverage of a vehicle according to one embodiment of the present invention.

FIG. 7A shows a detection coverage DC1 of the vehicle 10 of FIG. 1 according to one embodiment of the present invention. As shown in FIG. 7A, in this embodiment, the at least one automotive lighting device 100 includes a headlight of the vehicle 10. The automotive lighting device 100 includes at least one optical sensor 104 for detecting the space in front of the vehicle 10. In some embodiments, a horizontal detection angle θ1 of the at least one optical sensor 104 includes below approximately 120°. In some embodiments, a vertical detection angle θ2 of the at least one optical sensor 104 includes below approximately 120°.

The distance coverage DL" of the at least one optical sensor 104 includes approximately, for example, 50 meters. Therefore, in this embodiment, the optical sensor 104 emits an optical signal toward a detection coverage DC1. When an obstacle 71 is detected in the detection coverage DC1, a reflected optical signal is received by the at least one optical sensor 104 and a data signal is generated in response to the received reflected optical signal. Moreover, the driving assistant functions of the vehicle 10 will be activated to ensure safety of the driver and the passengers.

Figure 7B:
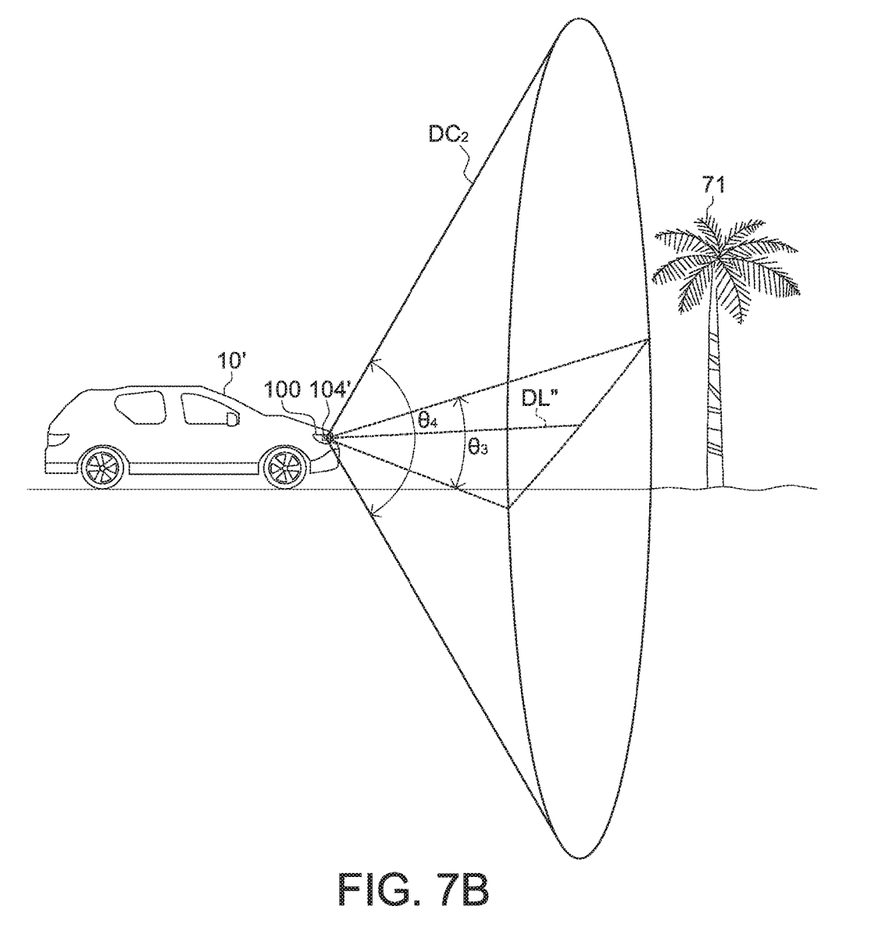
FIG. 7B shows a detection coverage of a vehicle according to one embodiment of the present invention.

FIG. 7B shows a detection coverage DC2 of a vehicle 10' according to one embodiment of the present invention. In this embodiment, as shown in FIG. 7B, the vehicle 10' is similar to the vehicle 10 of FIG. 7A but a horizontal detection angle θ3 of at least one optical sensor 104' of the at least one automotive lighting device 100 includes above approximately 120°. In some embodiments, a vertical detection angle θ4 of at least one optical sensor 104' includes above approximately 120°.

Figure 7C:
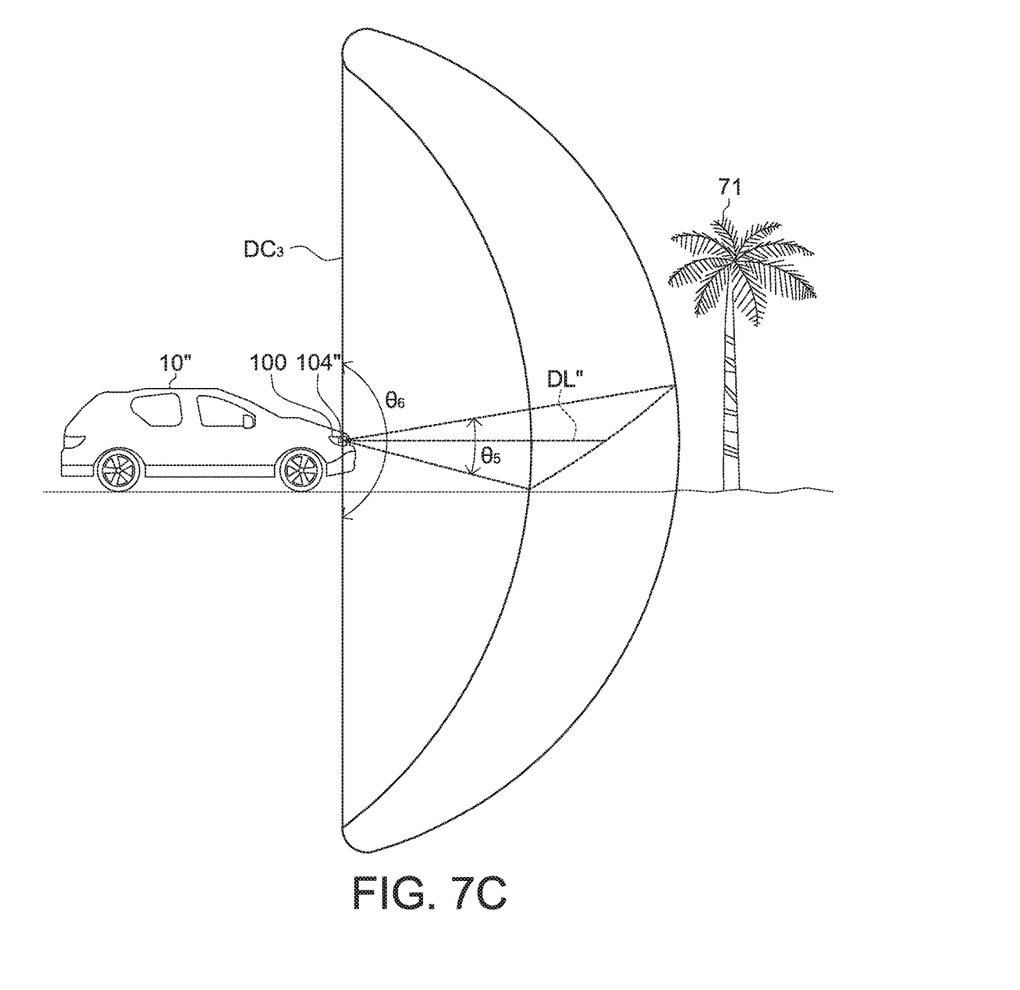
FIG. 7C shows a detection coverage of a vehicle according to one embodiment of the present invention.

FIG. 7C shows a detection coverage DC3 of a vehicle 10" according to one embodiment of the present invention. In this embodiment, as shown in FIG. 7C, the vehicle 10" is similar to the vehicle 10 of FIG. 7A but a horizontal detection angle θ5 of at least one optical sensor 104" of the at least one automotive lighting device 100 includes approximately from 0° to 120°. In some embodiments, a vertical detection angle θ6 of the at least one optical sensor 104" includes approximately from 0° to 120°.

Figure 8A:
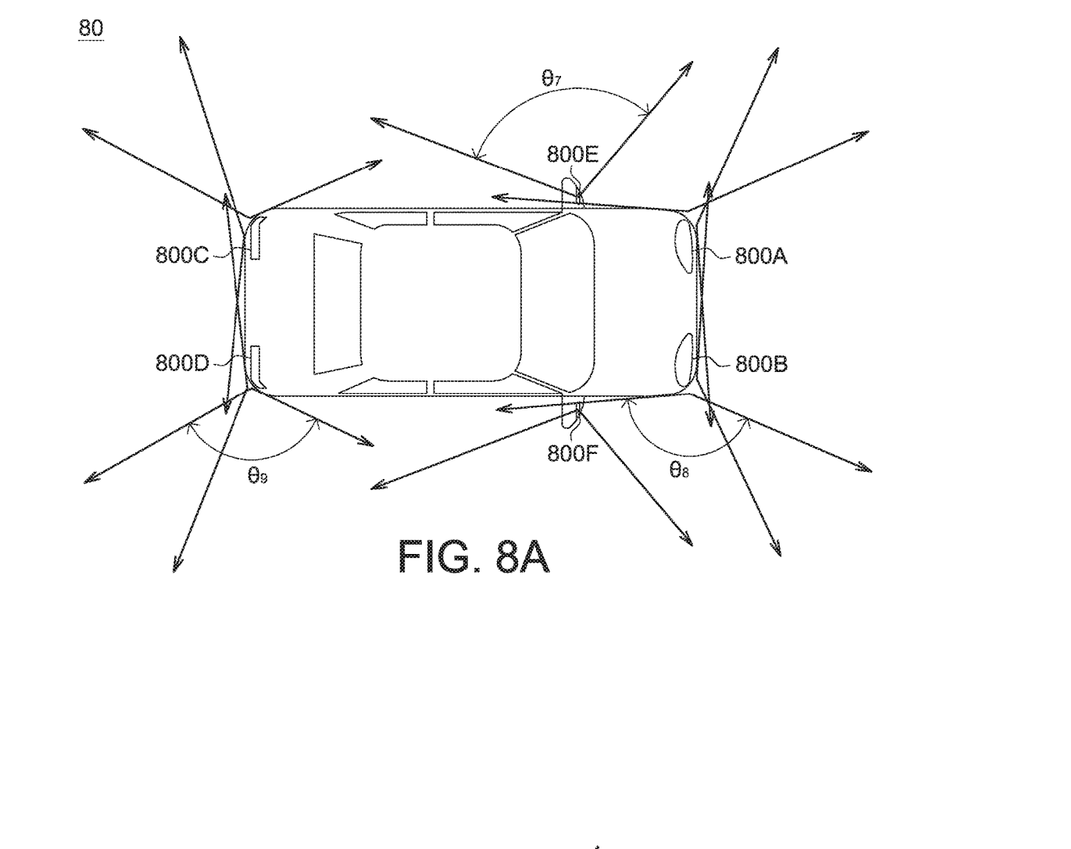
FIG. 8A shows a top view of detection coverage of a vehicle according to one embodiment of the present invention.

FIG. 8A shows a top view of detection coverage of a vehicle 80 according to one embodiment of the present invention. As shown in FIG. 8A, a plurality of automotive lighting devices is installed on a body of the vehicle 80. The plurality of automotive lighting devices, in this embodiment, includes headlights 800A and 800B, tail lights 800C and 800D and mirror mounted indicators 800E and 800F.

As shown in FIG. 8A, θ7 indicates a horizontal detection angle of an optical sensor of an automotive lighting device 800E, θ8 indicates a horizontal detection angle of an optical sensor of an automotive lighting device 800B, and θ9 indicates a horizontal detection angle of an optical sensor of an automotive lighting device 800D. In this embodiment, the horizontal detection angle θ7 is below approximately 120°. The horizontal detection angle θ8 is above approximately 120°. The horizontal detection angle 89 is below approximately 120°.

Figure 8B:
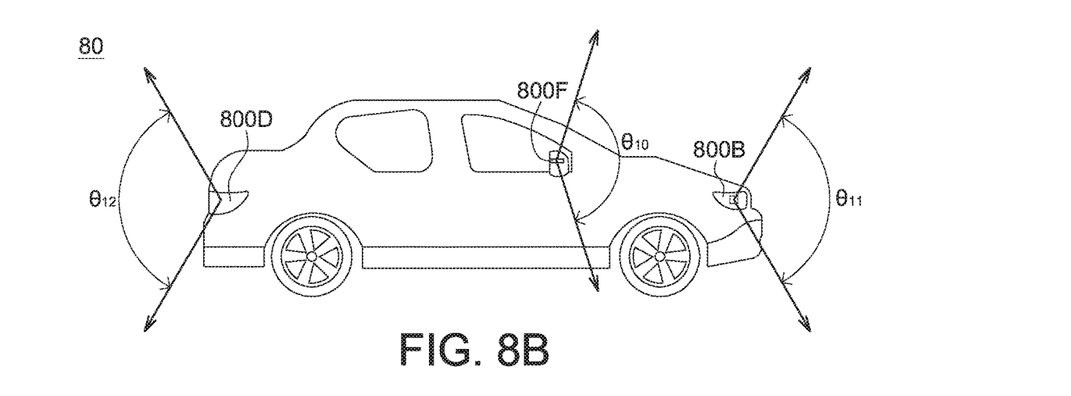
FIG. 8B shows a side view of detection coverage of the vehicle of FIG. 8A according to one embodiment of the present invention.

FIG. 8B shows a side view of detection coverage of the vehicle 80 of FIG. 8A according to one embodiment of the present invention. As shown in FIG. 8B, θ10 indicates a vertical detection angle of an optical sensor of an automotive lighting device 800F, θ11 indicates a vertical detection angle of an optical sensor of an automotive lighting device 800B, and 8θ12 indicates a vertical detection angle of an optical sensor of an automotive lighting device 800D. In this embodiment, the vertical detection angle θ10 is above approximately 120°. The vertical detection angle θ11 is above approximately 120°. The vertical detection angle θ12 is below approximately 120°.

Therefore, with an appropriate arrangement of the optical sensors, for example, each of the automotive lighting devices 800A to 800F including at least one optical sensor, the automotive lighting devices 800A-800F are capable of providing 360° detection mechanism to the vehicle 80. Therefore, the automotive lighting devices installed on the vehicle 80 are capable of providing surrounding detection to the vehicle 80.

In summary, the present invention discloses at least one optical sensor integrated into an automotive lighting device. The optical sensor is configured to emit an optical signal and generate a data signal in response to a received reflected optical signal. Therefore, when a plurality of the automotive lighting devices is installed surrounding on a body of a vehicle, the automotive lighting devices are able to provide surrounding detection for the vehicle. Moreover, when an obstacle appears in coverage of the automotive lighting devices, a safety mechanism of the vehicle is activated for ensuring the safety of a driver and passengers in the vehicle. Moreover, the safety mechanism includes stopping the vehicle which ensures the safety of the pedestrians.

It will be apparent to those skilled in the art that various modifications and variations can be made to the disclosed embodiments. It is intended that the specification and examples be considered as exemplary only, with a true scope of the invention being indicated by the following claims and their equivalents.

The invention claimed is:

1. An automotive lighting system for a vehicle, said automotive lighting system comprising:
   a taillight disposed at a vehicle equipped with an external object detection system;
   wherein said taillight comprises a housing that contains a light source operable to illuminate at least rearward of the equipped vehicle;
   wherein said external object detection system comprises a LIDAR sensor;
   wherein said LIDAR sensor is disposed in said housing of said taillight;
   wherein said LIDAR sensor is operable to emit optical signals at least rearward of the equipped vehicle, and wherein optical signals reflected back to said LIDAR sensor are processed by an electronic control unit of said external object detection system;
   wherein processing of reflected optical signals by said electronic control unit detects an object present exterior of the equipped vehicle;
   wherein processing by said electronic control unit comprises use of 3D imaging techniques to generate a 3D image of the object present exterior of the equipped vehicle; and
   wherein, responsive to detection of the object present exterior of the equipped vehicle, brightness of illumination by said light source exterior of the equipped vehicle increases from a first brightness value to a higher second brightness value for enhancing illumination of the detected object.

2. The automotive lighting system of claim 1, wherein said LIDAR sensor is disposed at a reflecting mirror contained in said housing of said taillight, and wherein said reflecting mirror is configured to reflect light emitted from said light source through a transparent surface of said taillight.

3. The automotive lighting system of claim 1, wherein responsive to detection of presence of the object external of the equipped vehicle, said light source changes a coverage distance of a lighting area at least rearward of the equipped vehicle.

4. The automotive lighting system of claim 1, wherein said electronic control unit determines when distance between the equipped vehicle and the detected object is shorter than a threshold value.

5. The automotive lighting system of claim 4, wherein the threshold value is 50 meters.

6. The automotive lighting system of claim 1, wherein a detection angle of said LIDAR sensor includes a degree from 0° to 180° horizontally.

7. The automotive lighting system of claim 1, wherein a detection angle of said LIDAR sensor includes a degree from 0° to 180° vertically.

8. The automotive lighting system of claim 1, wherein processing of reflected optical signals by said electronic control unit determines (i) size of the detected object, (ii) position of the detected object and (iii) distance to the detected object.

9. A vehicular object detection system, said vehicular object detection system comprising:
   a plurality of automotive lighting devices installed at a body of a vehicle equipped with said vehicular object detection system;
   wherein each of said plurality of automotive lighting devices comprises a housing that contains a light source operable to illuminate exterior of the equipped vehicle;
   a LIDAR sensor disposed at the equipped vehicle;
   wherein said LIDAR sensor is operable to emit optical signals at least rearward of the equipped vehicle, and wherein optical signals reflected back to said LIDAR sensor are processed by an electronic control unit of said vehicular object detection system;
   wherein processing of reflected optical signals by said electronic control unit detects an object present exterior of the equipped vehicle;
   wherein, responsive to detection of the object present exterior of the equipped vehicle, illumination by at least one of said plurality of automotive lighting devices exterior of the equipped vehicle changes to adjust illumination of the detected object; and
   wherein, responsive to processing of reflected optical signals by said electronic control unit, brightness of illumination by said at least one of said plurality of automotive lighting devices exterior of the equipped vehicle increases from a first brightness value to a higher second brightness value for enhancing illumination of the detected object.

10. The vehicular object detection system of claim 9, wherein responsive to detection of the object present exterior of the equipped vehicle, coverage distance of a lighting area by at least one of said plurality of automotive lighting devices exterior of the equipped vehicle extends for enhancing illumination of the detected object.

11. The vehicular object detection system of claim 9, wherein at least one of (i) light beam direction and (ii) focus of at least one of said plurality of automotive lighting devices is adjusted to enhance illumination of the detected object.

12. The vehicular object detection system of claim 9, wherein a detection angle of said LIDAR sensor includes a degree from 0° to 180° horizontally.

13. The vehicular object detection system of claim 9, wherein a detection angle of said LIDAR sensor includes a degree from 0° to 180° vertically.

14. The vehicular object detection system of claim 9, wherein an alert is generated when distance between the equipped vehicle and the detected object present exterior of the equipped vehicle is shorter than a threshold value.

15. The vehicular object detection system of claim 9, wherein one of said plurality of automotive lighting devices comprises said LIDAR sensor disposed thereat.

16. The vehicular object detection system of claim 9, wherein said LIDAR sensor is disposed at an upper portion of a reflecting mirror of one of said plurality of automotive lighting devices.

17. An automotive lighting system for a vehicle, said automotive lighting system comprising:
   an automotive lighting device disposed at a vehicle equipped with an external object detection system;
   wherein said automotive lighting device comprises a housing that contains a light source operable to emit a light beam exterior of the equipped vehicle;

wherein said external object detection system comprises a LIDAR sensor;

wherein said LIDAR sensor is disposed in said housing of said automotive lighting device;

wherein said LIDAR sensor is operable to emit optical signals exterior of the equipped vehicle, and wherein optical signals reflected back to said LIDAR sensor are processed by an electronic control unit of said external object detection system;

wherein processing of reflected optical signals by said electronic control unit detects an object present exterior of the equipped vehicle; and wherein, responsive to processing of reflected optical signals by said electronic control unit, at least one of (i) brightness of illumination by said light source exterior of the equipped vehicle increases from a first brightness value to a higher second brightness value for enhancing illumination of the detected object and (ii) coverage distance of a lighting area exterior of the equipped vehicle generated by said light source changes for enhancing illumination of the detected object.

18. The automotive lighting system of claim 17, wherein said automotive lighting device comprises a taillight.

19. The automotive lighting system of claim 18, wherein, responsive to processing of reflected optical signals by said electronic control unit, (i) brightness of illumination by said light source exterior of the equipped vehicle increases from a first brightness value to a higher second brightness value for enhancing illumination of the detected object and (ii) coverage distance of a lighting area exterior of the equipped vehicle generated by said light source changes for enhancing illumination of the detected object.

* * * * *

UNITED STATES PATENT AND TRADEMARK OFFICE
CERTIFICATE OF CORRECTION

PATENT NO. : 10,481,271 B2
APPLICATION NO. : 15/727806
DATED : November 19, 2019
INVENTOR(S) : Stefan Graf It is certified that error appears in the above-identified patent and that said Letters Patent is hereby corrected as shown below:

In the Specification

Column 6
Line 37, "detection angle 89" should be -- detection angle $\theta 9$ --

Signed and Sealed this
Twenty-fourth Day of December, 2019

Andrei Iancu
*Director of the United States Patent and Trademark Office*